United States Patent [19]

Denis et al.

[11] Patent Number: 4,846,656
[45] Date of Patent: Jul. 11, 1989

[54] APPARATUS FOR HEAT TREATMENT OF PREFORM NECKS

[75] Inventors: Gerard Denis, Turretot; Jean-Michel Rius, Epouville, both of France

[73] Assignee: Sidel, Le Havre, France

[21] Appl. No.: 228,407

[22] Filed: Aug. 5, 1988

[30] Foreign Application Priority Data

Aug. 17, 1987 [FR] France ............... 87 11393

[51] Int. Cl.⁴ .................. B29C 49/68; B29C 49/02
[52] U.S. Cl. .................. 425/174.4; 219/354; 425/526; 425/DIG. 13; 432/224
[58] Field of Search .......... 425/526, DIG. 13, 174.4; 264/535, DIG. 46; 219/354; 432/224, 225, 226, 230, 231

[56] References Cited

U.S. PATENT DOCUMENTS

| 4,005,969 | 2/1977 | Farrell | 425/526 |
| 4,117,050 | 9/1978 | Appel et al. | 219/354 |
| 4,300,880 | 11/1981 | Suzuki | 219/354 |
| 4,382,760 | 5/1983 | Wiatt et al. | 264/535 |
| 4,729,732 | 3/1988 | Shad | 264/535 |
| 4,744,937 | 5/1988 | Settembrini | 264/535 |

FOREIGN PATENT DOCUMENTS 47-1118  1/1972  Japan ................... 425/526

Primary Examiner—Willard Hoag
Attorney, Agent, or Firm—Sughrue, Mion, Zinn, Macpeak and Seas

[57] ABSTRACT

An apparatus for the heat treatment of the necks 1 of performs 2 includes a rotatable mandrel 3, which is inserted in and engaged with the neck of the preform to rotate it, a fixed protective skirt 4, and a heater 5 situated at the level of the neck. A sliding weight 28 is applied to the upper end of the neck during the heat treatment.

12 Claims, 2 Drawing Sheets

APPARATUS FOR HEAT TREATMENT OF PREFORM NECKS

BACKGROUND OF THE INVENTION

This invention relates to an apparatus for the heat treatment of the necks of thermoplastic preforms and, more particularly, to an apparatus for increasing the mechanical and heat resistance of the neck of a polyethyleneterephthalate (PET) preform.

In the packaging field, bioriented PET containers are currently widely used for the commercial distribution of carbonated beverages (lemonades, sodas, carbonated fruit juices, etc.), non-carbonated beverages (non-carbonated fruit juices), juices and/or sauces. These containers must be able, without undue deformation, to be subjected to relatively severe conditions of heat such as those encountered during the filling of the container with a hot liquid, or occurring during the pasteurization of the liquid contents of the container.

This wide use of PET containers is due to the fact that bioriented PET has good mechanical and heat resistance, a good appearance, and high chemical inertia to the products contained in the containers, and it forms an effective barrier against the gases contained in the liquids and against the oxygen in the air (conservation of the products contained without oxidation).

The containers are obtained from a preform, which is generally an amorphous PET, and is brought to a sufficient temperature and then introduced into a mold and pressed against the walls of the mold through the introduction of a gas under pressure. During this blow-molding, the parts of the container which are stretched are bioriented. However, the parts of the container which are not bioriented, in particular the neck and possibly the base, do not have the same heat and mechanical resistance as the remainder of the container. This is a problem because the neck must retain the same size characteristics to allow sealed closing once the containers are filled with a hot liquid or undergo a pasteurization treatment.

It is known to improve the heat and mechanical resistance of the neck of a PET container by subjecting the neck to a heat treatment to increase its degree of crystallization by increasing the density of its spherolitic structure. However, since the neck of the container is provided with a thread intended for screwing on a cap, the thickness of the neck is not uniform and, during the heat treatment, local deformations occur which hinder or prevent sealed closing.

It is also known to introduce, during the heat treatment of the neck of the container, a cylindrical mandrel having a diameter smaller than that of the inside diameter of the neck, and then shrinking the neck by cooling it with blown air to bring the interior of the neck into contact with the mandrel. While this avoids the above-noted disadvantages, providing the calories necessary for the heat treatment cannot be strictly localized on the neck and local deformations can appear on the bioriented body of the container.

It is further known to apply a reinforcing heat treatment, not to the neck of the manufactured container but to the neck of the preform, prior to its blow-molding. For this purpose, a heating block made of a material which is a good heat conductor, and having a cavity whose shape corresponds to that of a preform neck, is applied to the neck of a preform for a sufficient length of time to cause complete crystallization of the neck. The heating lock is traversed by a sliding cylindrical mandrel which is inserted into the neck of the preform. However, in this device, there is poor contact between the heating block and the neck of the preform because the neck has a complex shape due to its screw thread. In addition, the top of the thread which is in contact with the cavity of the heating block is deformed because it receives a high heat flow. Finally, with this device, it is necessary to have one type of heating block for each type of neck.

SUMMARY OF THE INVENTION

An object of this invention, therefore, is to overcome the disadvantages described above by providing an apparatus which enables the heat treatment of the neck of a container without deformation and without heating any part of the preform other than the neck.

The apparatus comprises a mandrel with a vertical axis which is inserted into the neck of a preform. The mandrel is rotatably movable around its axis, and drives the preform in rotation. A fixed protective skirt is provided for the body of the preform, and a heating device is located at the neck of the preform.

DETAILED DESCRIPTION OF THE PREFERRED EMBODIMENT

Figure 1:
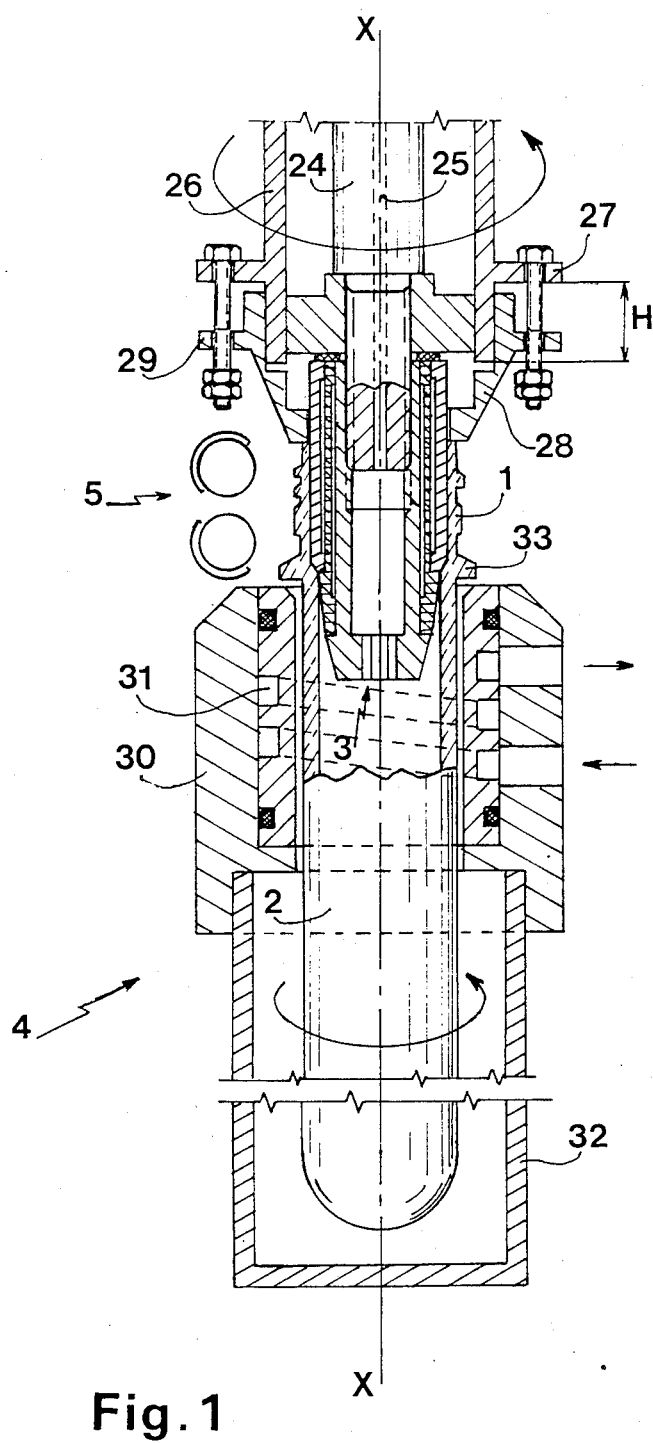
FIG. 1 is a vertical cross-section of an apparatus in accordance with the invention.

The apparatus shown in FIG. 1 and used for the heat treatment of the neck 1 of a preform 2, comprises a calibrating mandrel 3, a protective skirt 4, and an infrared heater 5.

Figure 2:
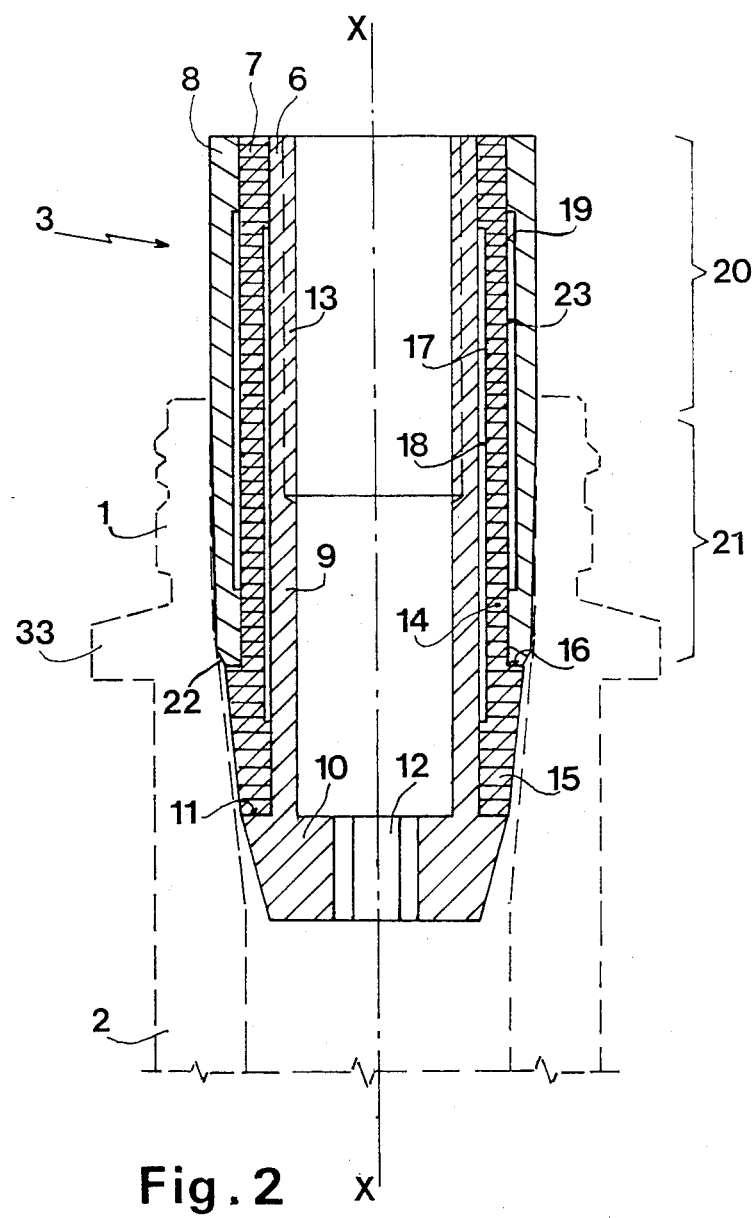
FIG. 2 is a larger scale cross-section of a part of the apparatus which is inserted into the neck of a preform.

The mandrel 3, as best shown in FIG. 2, is a rotating component with a vertical axis X—X of a generally cylindroconical shape. Going from the axis X—X towards the exterior, it comprises a central stem 6, an intermediate sheath 7, and an exterior sheath 8.

The stainless steel central stem 6 comprises a cylindrical tube 9 completed at its lower end by a trunk of a cone 10 which converges downwardly at an angle between 10° and 20°, preferably 15°. The trunk of the cone is joined to tube 9 by its large base, and its connection with the tube forms a radial shoulder 11. A hexagonal hole 12, with axis X—X, is bored in the trunk of the cone 10 and exits into tube 9, in the upper half of which a thread 13 is provided.

The intermediate sheath 7, which is coaxial to the central stem, is made of a heat-insulating material having good mechanical characteristics, such as a heat-hardenable resin reinforced with glass fibers or a ceramic component. It includes a cylindrical tube 14, whose internal diameter is very slightly greater than the external diameter of the stem tube 9, terminating at its lower end in a trunk of a cone 15 which converges downwardly at an angle between 6° and 7°. The trunk of the cone 15 is joined to tube 14 by its large base, and its connection with the tube forms a radial shoulder 16. The diameter of the small base of the trunk of cone 15 is equal to the large base of the trunk of cone 10 of the central stem 6. A cylindrical bore or relief 17, whose diameter is greater than the internal diameter of tube 14, is provided in the internal wall of the tube. The sheath 7 is arranged with no play around the central stem 6, with its lower end, composed of the trunk of cone 15, abutting against the radial shoulder 11. Bore 17 of the tube 14 and the exterior surface of tube 9 of the central stem 6 form a closed cylindrical chamber 18 comprising an insulating air space.

The exterior sheath 8, which is coaxial to the central stem 6 and to the intermediate sheath 7, is made of a good heat conductive material, such as a bronze with beryllium. Its inside diameter is slightly greater than the external diameter of the intermediate sheath 7. A cylindrical bore or relief 19, whose diameter is greater than the internal diameter of sheath 8, is provided in the internal wall thereof. From its upper end, the exterior surface of sheath 8 has successively: a cylindrical component 20 extending over half its height, whose exterior diameter is equal to the interior diameter of the neck of the final container, a slightly truncated, downwardly converging component 21, whose angle with the top is between 30 minutes and 1°, and a chamfer 22 whose angle with the top is 30°. Sheath 8 is arranged without play around the intermediate sheath 7, with its lower end abutting against shoulder 16 thereof. The bore 19 of sheath 8 and the exterior surface of intermediate sheath 7 form a closed cylindrical chamber comprising an insulating air space.

Thus, from its lower end, the mandrel 3 has three successive truncated components 10, 15 and 21, whose angles with the top are decreasing, and a cylindrical component 20.

Mandrel 3 is fixed by means of its thread 13 to the lower threaded end of a shaft 24, with axis X—X, bored with a coaxial hole 25, and driven in rotation by a device not shown, connected to a coaxial cylindrical sleeve 26 provided, at a distance H from its lower end, with a flange 27 which is bored with equidistant holes. The internal diameter of the sleeve 26 is greater than the external diameter of the shaft 24.

A weight 28 of approximately 200 grams, with a cylindroconical shape with axis X—X, and whose cylindrical part has a height H, is slidably mounted on the lower end of sleeve 26 beneath the flange 27. Weight 28 is provided with a flange 29 which is bored with equidistant holes, and its lower end surrounds, without contact, the cylindrical part 20 of mandrel 3. Sleeve 26 and weight 28 are connected to one another by means of bolts engaged in the holes of flanges 27 and 29. The nuts are not completely tightened so that the weight may move in vertical translation in relation to sleeve 26 and in relation to mandrel 3.

Protective skirt 4, composed of a metal casing 32 with axis X—X, is fixed at its upper end to the lower end of a head 30 which is cooled by circulation of a cooling liquid or gas inside a helical cavity 31. The interior diameters of casing 32 and head 30 are greater than the external diameter of the body of the preform 2. The assembly of the casing 32 and head 30 is translatably moved along axis X—X by means of a device which is not shown.

The operation of the device is as follows. The preforms 2 from a stock are oriented neck upwards and delivered to a work station which is equipped with several heat treatment devices which are identical to the one described above. Shaft 24 is lowered and mandrel 3 is introduced into the neck 1 of the preform 2 until the cylindrical part 20 of the mandrel 3 has penetrated by approximately 5 mm into the neck 1. The exterior diameter of the cylindrical part 20 of mandrel 3 is greater by 0.1 mm than the interior diameter of neck 1. The slight tightening of neck 1 on mandrel 3, caused by this difference in diameter, enables the preform 2 to be fixed on the mandrel. Skirt 4 is then raised such that the upper end of head 30 is situated a few tenths of a millimeter beneath flange 33 of neck 1. Mandrel 3 is placed in rotation by means of shaft 24, driving with it the preform 2 whose neck 1 is situated at the level of the infrared heating device which brings the neck to a temperature of at least 190° C. (PET crystallization temperature); in order to increase the rate of production, the heating is preferably carried out at a temperature of 190° to 210° C. for a period of approximately one minute. This treatment causes the crystallization of the PET. During the heating the neck is softened and decreases in volume due to the fact that the crystallization causes an increase in the density of the PET; however, weight 28, which can slide around sleeve 26 and mandrel 3, accompanies the softened neck 1 during its shrinkage and weighs thereupon in order to provide perfect evenness of the upper end of neck 1. A slow cooling, on the order of 20 seconds, is then carried out, in order to provide a preform 2 with a crystallized neck 1. Skirt 4 is then lowered and the preform 2 is separated from the mandrel 3.

The advantages presented by the apparatus in accordance with the invention include the following:

(1) the interior diameter of the neck of the preform is perfectly defined by the mandrel 3 which is inserted therein;

(2) the evenness of the upper end of the neck is ensured by the action of the movable weight 28, which is in contact with such end throughout the heat treatment during which the neck is softened;

(3) the hole 12 provided in the end of mandrel 3 enables the removal of the air contained in the preform through tube 9 of the mandrel and hole 25 of shaft 24 which exits to the outside. In this manner, the preform can easily be placed on the mandrel and, during the heating of the neck, the heat-expanded air can be freely released, which prevents the preform from separating from the mandrel due to the overpressure created by the expansion of the air;

(4) the part of the preform immediately below the neck is energetically cooled by the circulation of a cooling fluid in the head 30, which prevents any modification of the material of the preform body; and (5) sheath 7, which is made of an insulating material, as well as the air spaces 18 and 23 provided in the mandrel, prevent the heat from dissipating over the entire mass thereof. In this manner, only the outer sheath 8, which is made of a good heat-conducting material, can be heated by conduction and can uniformly distribute the heat over the interior periphery of the neck.

What is claimed is:

1. An apparatus for the heat treatment of the neck (1) of a preform (2) made of a thermoplastic material such as polyethyleneterephthalate, comprising: a rotatably driven mandrel (3) having a vertical axis (X—X) and adapted to be inserted into and frictionally engaged with the neck of a preform, such that the mandrel and the preform rotate together about said axis, a skirt (4) positioned to surround a lower, body portion of the preform below the neck when the preform is frictionally engaged with the mandrel for rotation, and heating means (5) positioned adjacent the neck of the preform above said skirt when the preform is so engaged with the mandrel.

2. The apparatus in accordance with claim 1, wherein the mandrel comprises a central core (6) around which are coaxially arranged an intermediate sheath (7) made of a thermally insulating material, and an exterior sheath (8) made of a material which is a good heat conductor.

3. The apparatus in accordance with claim 2, wherein the mandrel contains two closed cylindrical chambers (18, 23) arranged respectively between the central core (6) and the intermediate sheath (7) and between the intermediate sheath (7) and the exterior sheath (8).

4. The apparatus in accordance with claim 2, wherein, from a lower end, the mandrel has three successive coaxial truncated components (10, 15, 21) whose angles of convergence successively decrease, and a cylindrical component (20) whose exterior diameter is equal to an interior diameter of the neck of a final container obtained from the preform.

5. The apparatus in accordance with claim 2, wherein the central core of the mandrel comprises a cylindrical tube (9) with axis (X—X) terminating at one end in a truncated cone (10) converging at an angle between 10° and 20°, a hole (12) with axis (X—X) exiting into said tub defined in said cone, and a juncture between said cone and the tube forming a radial shoulder (11).

6. The apparatus in accordance with claim 2, wherein the intermediate sheath (7) comprises a cylindrical tube (14) with axis (X—X) terminating at one end in a truncated cone (15) converging at an angle between 6° and 7°, with a juncture between the tube and the cone forming a radial shoulder (16).

7. The apparatus in accordance with claim 2, wherein the exterior surface of the exterior sheath (8) defines in succession from one end, a cylindrical component (20) extending over half of the sheath height, a slightly truncated component (21) converging at an angle between 30 minutes and 1°, and a chamfer (22) angled at 30°.

8. The apparatus in accordance with claim 1, wherein the mandrel (3) has a lower end defining a stepped, increasingly converging, truncated cone, and an upper end coupled to a centrally bored shaft (24) which is rotatably driven about said axis (X—X).

9. The apparatus in accordance with claim 8, wherein the shaft (24) is connected to a cylindrical coaxial sleeve (26), whose diameter is greater than that of said shaft, and which is provided at a distance (H) from its lower end with a flange (27) bored with equidistant holes.

10. The apparatus in accordance with claim 9, wherein, around the lower end of the sleeve (26), under the flange (27), a cylindro-conical shaped weight (28) is slidably mounted, a cylindrical part of said weight having a height (H) equal to said distance.

11. The apparatus in accordance with claim 1, wherein the skirt (4) comprises a casing (32) with axis (X—X) fixed at its upper end to a head (30) defining a helical passage (31) for the circulation of a cooling fluid therein.

12. The apparatus in accordance with claim 11, wherein the interior diameters of the casing (32) and the head (30) are greater than the exterior diameter of the body of the preform.

* * * * *